United States Patent [19]

Fukata et al.

[11] 4,001,521
[45] Jan. 4, 1977

[54] SIGNAL IDENTIFICATION SYSTEM

[75] Inventors: Yasuo Fukata, Mitaka; Ryoichi Hatsumi, Nagareyama, both of Japan

[73] Assignee: Kokusai Denshin Denwa Kabushiki Kaisha, Japan

[22] Filed: May 14, 1975

[21] Appl. No.: 577,155

[30] Foreign Application Priority Data

May 17, 1974 Japan .............................. 49-55050

[52] U.S. Cl. .......................................... 179/84 VF
[51] Int. Cl.² ........................................ H04M 1/50
[58] Field of Search ......... 179/84 VF; 343/100 CL; 340/171 R, 171 A, 171 PF; 328/138

[56] References Cited
UNITED STATES PATENTS

| | | | |
|---|---|---|---|
| 3,652,805 | 3/1972 | Wisner | 179/84 VF |
| 3,812,432 | 5/1974 | Hanson | 179/84 VF |
| 3,863,030 | 1/1975 | Mills | 179/84 VF |
| 3,882,283 | 5/1975 | Proudfoot | 179/84 VF |

Primary Examiner—Kathleen H. Claffy
Assistant Examiner—Joseph A. Popek
Attorney, Agent, or Firm—Robert E. Burns; Emmanuel J. Lobato; Bruce L. Adams

[57] ABSTRACT

A signal identification system, in which a signal of a specified frequency included in an analog signal indicated by an input pulse train converted from the analog signal is detected from the pulse train. The input pulse train is multiplied by two reference wave pulse trains having peak valves following the signal of the specified frequency but displaced by $\pi/2$ in phase from each other, respectively. The results of the multiplications are separately accumulated. The signal of the specified frequency is identified by utilizing a fact that the absolute value of at least one of the accumulated values exceeds a predetermined threshold value in the range of a permissible frequency deviation of the signal of the specified frequency and in the range of its permissible level fluctuation. The decision of the above fact may be performed when the accumulation is achieved at a certain number of times, which is predetermined in view of a permissible frequency deviation and a permissible level fluctuation of the signal of the specified frequency.

4 Claims, 11 Drawing Figures

SINE WAVE

RECTANGULAR WAVE

SIGNAL IDENTIFICATION SYSTEM

BACKGROUND OF THE INVENTION

1. Field of the Invention

This invention relates to an electric signal identification system, and more particularly to a single-frequency or multi-frequency signal identification system for use in telephone switching, data switching, etc.

2. The Prior Art

Recently, a demand for domestic and international telephone communication has remarkedly increased. To meet with the demand, countermeasures such as introduction of electronic switching apparatus and increases of other equipments are now being taken. In signalling systems for telephone switching, a domestic common channel signalling system and a new signalling system of the type providing a separate digital transmission line for signal transmission, which is called No. 6 signalling system, have now been tested for commercialization. However, in most cases, use is made of a signalling system employing in-band or out-band voice frequency signals.

Voice-frequency signals for telephone switching are divided into a supervisory signal for supervising a call switching process and an address signal for a call switching direction. These signals are each composed of a single-frequency or multi-frequency signals in a voice frequency band. In international telephone switching, for example, in the case of the No. 5 signalling system, the supervisory signal is composed of one or both of voice-frequency signals of 2400Hz and 2600Hz. The address signal is refered to as an MF signal as employed in domestic telephone systems and is composed of signals of six frequencies which are spaced apart at intervals of 200Hz in the frequency band range from 700Hz to 1700Hz. By combining pairs of the six frequencies, a digit, a start of message signal and an end of message signal are indicated.

One method that has been usually employed for the identification of such voice signals is to extract a signal of a desired frequency from an input signal through a filter and then to convert the extracted signal into a DC level for identification. In this method, however, the filter occupies, due to its construction, a large part of the identification device of such a low-frequency signal as a telephone signal and, further, there arise problems peculiar to an analog circuit such as a characteristic change due to ageing, etc.

SUMMARY OF THE INVENTION

An object of this invention is to provide a signal identification system which is easily subject to miniaturization, multiplexing and economization and in which, by digital logic operation of an input pulse train converted from an analog signal, a desired frequency included in the analog signal is identified.

In accordance with the principle of this invention, an input signal is multiplied by each of two reference waves of a frequency to be identified (the two reference waves being displaced by $\pi/2$ in phase from each other) and the multiplied results are separately accumulated. When the absolute value of at least one of the accumulated values exceeds a predetermined threshold value, the input signal is identified as a signal of the desired frequency. This identification is achieved by digital logic operation with a predetermined constant sampling period.

BRIEF DESCRIPTION OF THE DRAWINGS

The principle, construction and operation of this invention will clearly be understood from the following detailed description taken in conjunction with the accompanying drawings, in which.

DETAILED DESCRIPTION OF THE INVENTION

Figure 1A:
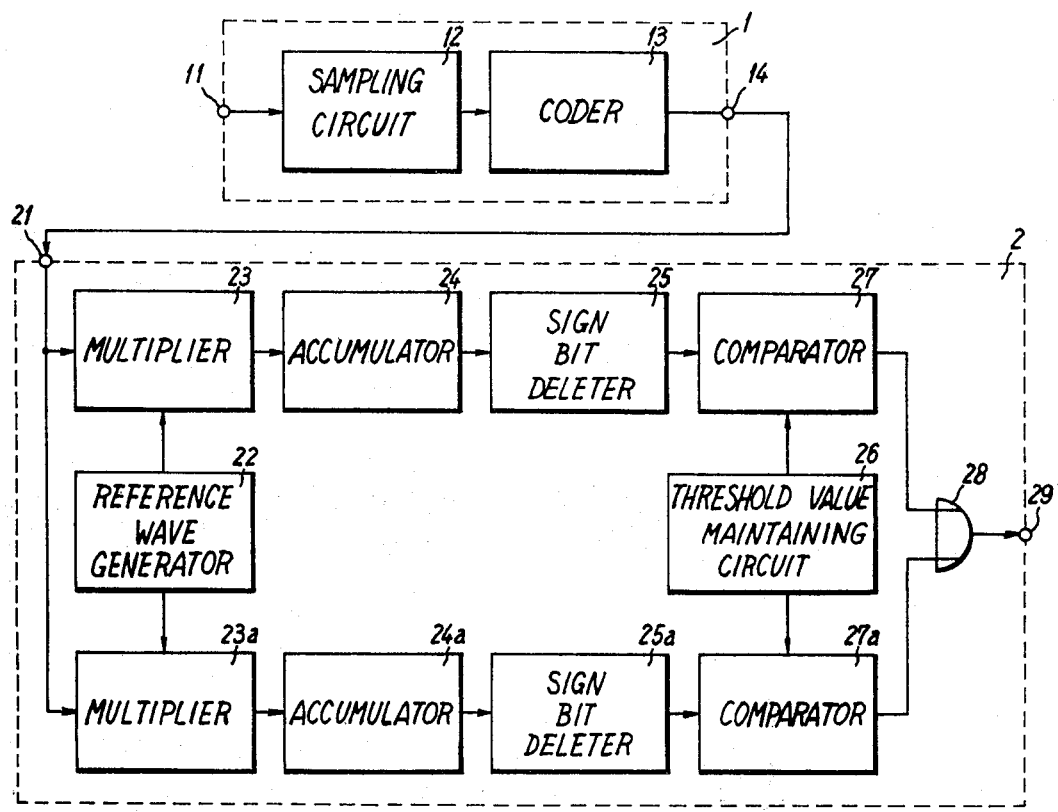
FIG. 1A is a block diagram illustrating an example of this invention.
Figure 1B:
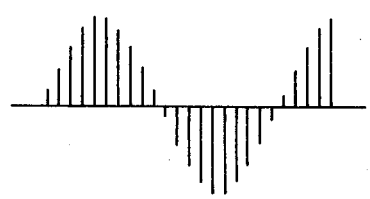
FIGS. 1B and 1C are waveforms illustrating examples of reference wave pulse trains employed in this invention.
Figure 1C:

With reference to FIGS. 1A, 1B and 1C, the principle of this invention will be described. In FIG. 1A, reference numeral 1 indicates a conventional PCM coder; 11 designates an analog signal receiving terminal; 12 denotes a sampling circuit for sampling a signal from the terminal 11 by the use of a sampling pulse train of predetermined constant sampling period $\tau$; 13 identifies a coder for coding the sampled pulse train into PCM code words; and 14 represents an output terminal of the PCM coder 1. Reference numeral 2 designates an identification circuit embodying this invention; 21 indicates an input terminal of the identification circuit 2 supplied with the pulse train from the PCM coder 1 to identify it; 22 represents a reference wave generator for generating code words indicative of two reference wave pulse trains (as shown in FIG. 1B or 1C) displaced by $\pi/2$ in phase from each other; and 23 and 23a identify multipliers for obtaining the respective products of the pulse outputs of the reference wave generator 22 and the input pulse train of the input pulse terminal 21. The reference wave pulse trains to the multipliers 23 and 23a are simultaneously applied thereto displaced by $\pi/2$ in phase from each other, as described previously. Reference numerals 24 and 24a represent accumulators for accumulating the product outputs derived from the multipliers 23 and 23a, respectively; 25 and 25a show sign bit deleters for obtaining the absolute values of the contents of the accumulators 24 and 24a, respectively; 26 refers to a threshold value maintaining circuit for maintaining a predetermined threshold value; 27 and 27a indicate comparators which compare the absolute values processed by the absolute value circuits 25 and 25a with the threshold value of the threshold value maintaining circuit 26, respectively, and each produces an output 1 or 0 depending upon whether the threshold value is larger or smaller than the abovesaid absolute values; 28 designates an OR circuit for obtaining the logical sum of the outputs derived from the comparators 27 and 27a; and 29 denotes an output terminal of the identification circuit 2.

To facilitate a better understanding of the invention, the following description will be made first in analog representation and then in digital representation.

Assume that an input signal Y to the receiving terminal 21 of the identification circuit 2 is as follows:

$$Y = A_1 \sin(2\pi f_1 t + \phi_1) \qquad (1)$$

and that the two reference waves phase-displaced by $\pi/2$ apart from each other are as follows:

$$R_1 = A_0 \sin(2\pi f_0 t + \phi_0) \qquad (2)$$

$$R_2 = A_0 \cos(2\pi f_0 t + \phi_0) \qquad (3)$$

In the above $A_1$ and $A_0$ are the amplitudes of the input signal and the reference waves; $\phi_1$ and $\phi_0$ are their phase positions; $f_1$ is the frequency of the input signal $Y$; and $f_0$ is a frequency to be identified. By multiplying the input signal $Y$ by the reference waves $R_1$ and $R_2$, respectively, the following products are obtained:

$$Y_1 = \frac{A_1 A_0}{2} [\cos\{2\pi(f_1 - f_0)t + (\phi_1 - \phi_0)\}$$
$$- \cos\{2\pi(f_1 + f_0)t + (\phi_1 + \phi_0)\}] \qquad (4)$$

$$Y_2 = \frac{A_1 A_0}{2} [\sin\{2\pi(f_1 - f_0)t + (\phi_1 - \phi_0)\}$$
$$+ \sin\{2\pi(f_1 + f_0)t + (\phi_1 + \phi_0)\}] \qquad (5)$$

These product outputs are each accumulated until a sampling number $n$ is reached, by which the following accumulated values are obtained:

$$Y_1 = \sum_{}^{n} Y_1 = \frac{A_1 A_0}{2} \left[ \frac{\cos\left\{(n-1)\frac{\alpha}{2} - \phi_A\right\}}{\sin \frac{\alpha}{2}} \sin n \frac{\alpha}{2} \right.$$
$$\left. - \frac{\cos\left\{(n-1)\frac{\beta}{2} - \phi_B\right\}}{\sin \frac{\beta}{2}} \sin n \frac{\beta}{2} \right] \qquad (6)$$

$$Y_2 = \sum_{}^{n} Y_2 = \frac{A_1 A_0}{2} \left[ \frac{\sin\left\{(n-1)\frac{\alpha}{2} - \phi_A\right\}}{\sin \frac{\alpha}{2}} \sin n \frac{\alpha}{2} \right.$$
$$\left. + \frac{\sin\left\{(n-1)\frac{\beta}{2} - \phi_B\right\}}{\sin \frac{\beta}{2}} \sin n \frac{\beta}{2} \right] \qquad (7)$$

where $$\alpha = 2\pi(f_1 - f_0)\tau \qquad (8)$$

$$\beta = 2\pi(f_1 + f_0)\tau \qquad (9)$$

$$\phi_A = \phi_1 - \phi_0 \qquad (10)$$

$$\phi_B = \phi_1 + \phi_0 \qquad (11)$$

$\tau$ being the sample period.

From the first and second terms of the equations (6) and (7), it appears that the first and second terms do not exceed $$1/\sin \frac{\alpha}{2} \qquad (12)$$

and $$1/\sin \frac{\beta}{2} \qquad (13),$$

respectively, regardless of the scanning number $n$ and the phase positions $\phi_A$ and $\phi_B$. Then, $\alpha$ and $\beta$ in the equations (12) and (13) are generalized such that $$1/\sin \frac{x}{2},$$

Figure 2:
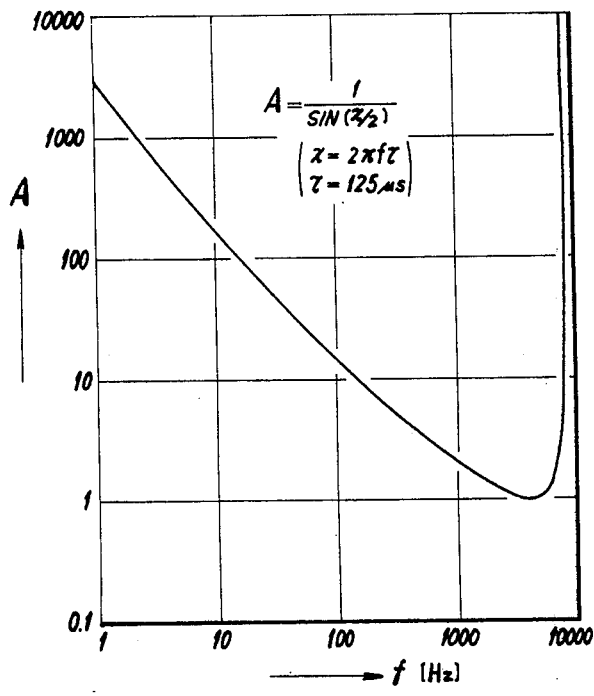
FIGS. 2 and 3 are characteristic curves explanatory of the digital logic operations performed in accordance with the principle of this invention.

($x = 2\pi f \tau$) and, in this case, such a curve as shown in FIG. 2 is obtained. In FIG. 2, $\tau$ is selected such that $\tau = 1/8000 = 125 \mu s$ in view of sampling at 8KHz which is now employed for PCM coding. Assuming that the frequency $f_0$ to be identified is 1000 Hz and that the input frequency is 1010Hz, a value $(f_1 - f_0)$ in the $\alpha$ component in the equation (12) is 10Hz and a value $(f_1 + f_0)$ in the $\beta$ component in the equation (13) is 2010Hz. From this, the value at $f_\alpha = 10$Hz in FIG. 2, that is, $$1/\sin \frac{\alpha}{2} \approx 250$$

is obtained, and the value at $f_\beta = 2010$Hz, that is, $$1/\sin \frac{\beta}{2} \approx 1.5$$

is obtained. As will be seen from the above, under the condition that $f_1 \approx f_0$, it follows that $$1/\sin \frac{\alpha}{2} \gg 1/\sin \frac{\beta}{2},$$

and the accumulated values of the equations (6) and (7) are almost determined by the value of the first term $$1/\sin \frac{\alpha}{2}$$

of each equation.

Figure 3:
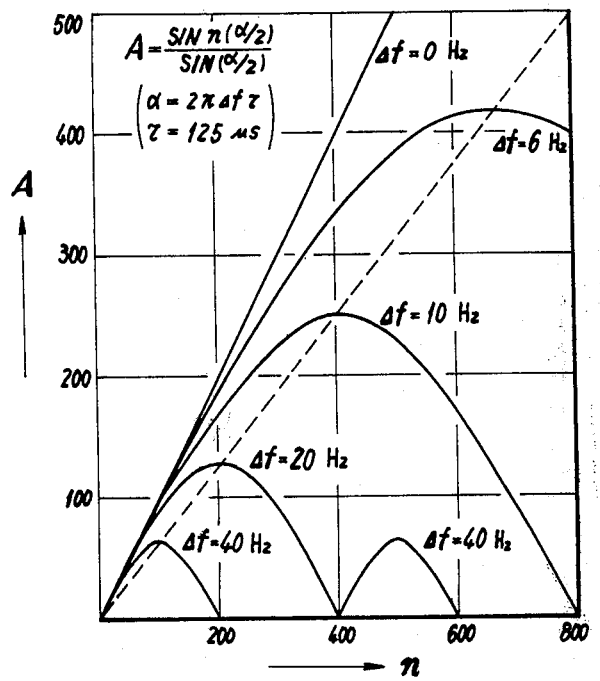

Putting aside the value of the second term $$1/\sin \frac{\beta}{2}$$

of each equation which will be closely considered in the circuit design and paying attention only to the first term, it will appear that the first term does not exceed $$\sin n \frac{\alpha}{2} / \sin \frac{\alpha}{2} \qquad (14)$$

regardless of the phase position $\phi_A$. Assuming that $\alpha = 2\pi(f_1 - f_0)\tau \equiv 2\pi \cdot \Delta f \cdot \tau$ in the equation (14), the value of the equation (14) changes with the sampling number $n$ as depicted in FIG. 3. In FIG. 3, if the predetermined threshold value is assumed to be, for example, 255, all signals within the range of $\Delta f = 10Hz$ at the time of the sampling number $n = 400$ (that is, $125\mu s \times 400 = 50\mu s$) exceed the threshold value, so that the signals exceeding the threshold value can be identified as those signals in the range of $\Delta f = 10Hz$ (that is, $f_0 \pm 10Hz$). In practice, the abovesaid threshold value is selected to be a little lower valve in anticipation of the margin for an input level fluctuation.

Figure 4:
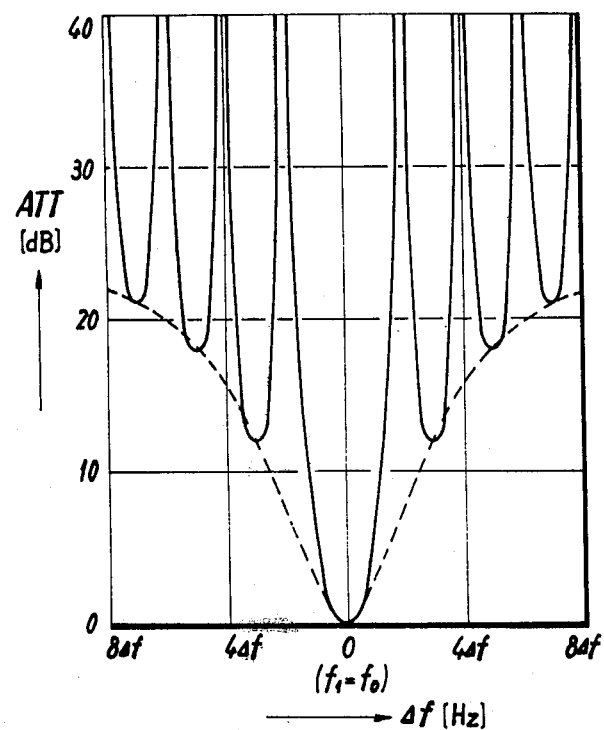
FIG. 4 is a diagram showing the characteristic of the system of this invention.

Based on FIG. 3, the value at the time of $\Delta f = 0Hz$ (that is, $f_1 = f_0$) is assumed to be 0dB and one example of the value of each $\Delta f$ is indicated by the broken line in FIG. 4. By the way, in this invention, since the phase position $\phi_1$ of the input signal and the phase position $\phi_0$ of the reference waves are not controlled, in order to compensate for $\phi_A$, the absolute values of the accumulated values $Y_1$ and $Y_2$ are calculated from the equations (6) and (7) and a larger one of them is selected in a logical manner. Namely, the numerator components of the first terms of accumulated values $Y_1$ and $Y_2$ are respectively such that $$\cos\left\{(2n-1)\frac{\alpha}{2} - \phi_A\right\}$$

and that $$\sin\left\{(2n-1)\frac{\alpha}{2} - \phi_A\right\},$$

so that either one of their absolute values is larger than or equal to $1/\sqrt{2}$. Accordingly, as compared with the above described mode of operation in view of a maximum value of each equation, the margin of the receiving level is inevitably reduced by $1/\sqrt{2}$ but if the threshold value is correspondingly decreased, there is no change in the principle of identification.

Figure 5:
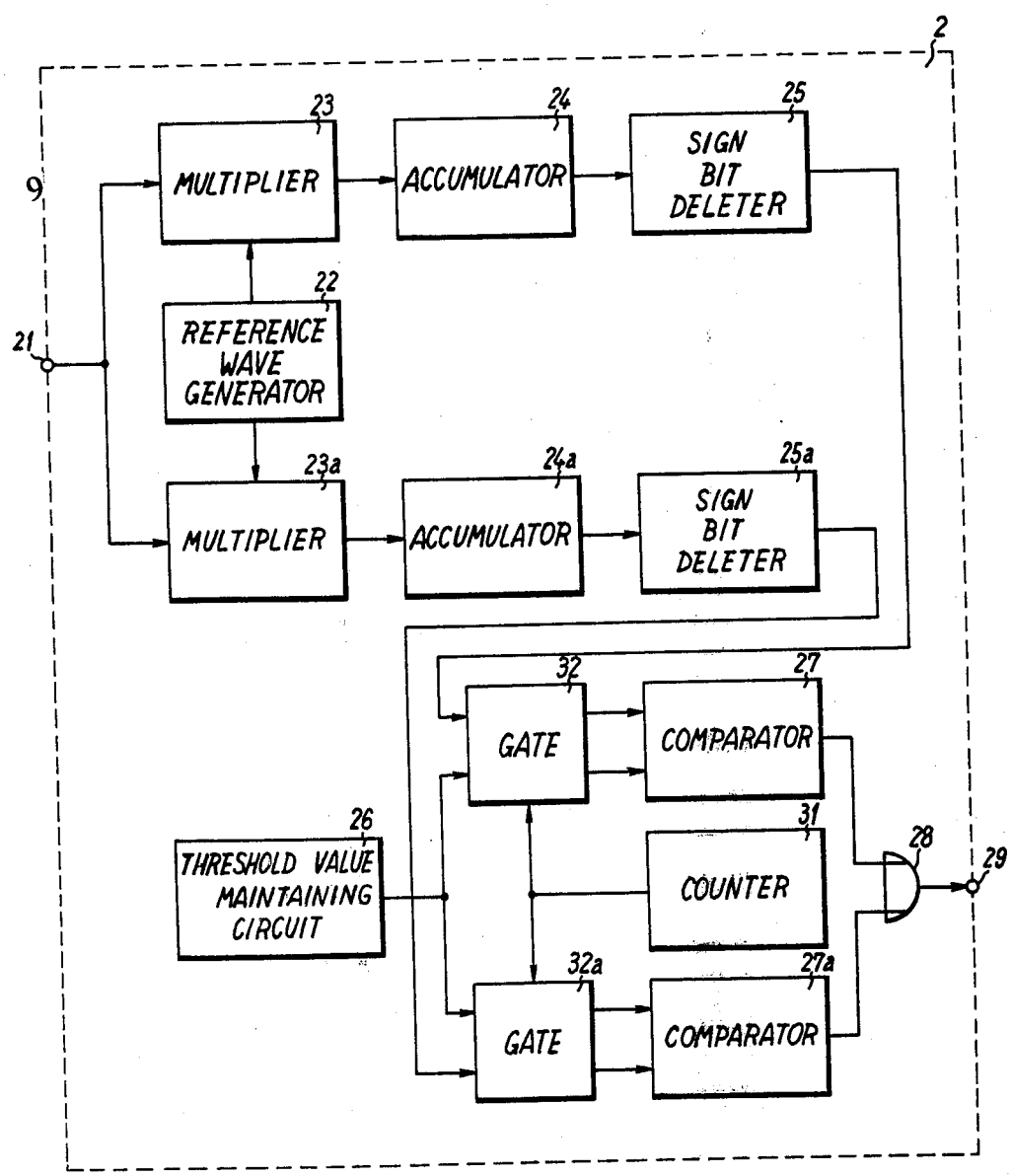
FIGS. 5 and 6 are block diagrams each illustrating an example of this invention.

Under the principle described above, while the decision as to the presence of a signal to be detected is made in consideration of the comparison of the absolute values of the accumulated values with the threshold value when the absolute values of the accumulated values exceed the threshold value before the sampling number $n$ reaches a predetermined value, the above decision may be performed at the time when the sampling number $n$ has reached a predetermined value. One example of the latter is shown in FIG. 5. FIG. 5 is different from FIG. 1A in the provision of a counter 31 which counts the number of sampling pulses synchronized with the timing (a constant sampling period) of the input signal supplied from the input terminal 21 and produces a pulse when the sampling has been effected until a predetermined number of times, and gate circuits 32 and 32a which are opened or closed in accordance with the presence or absence of the abovesaid pulse from the counter 31. The characteristic of this case is indicated by the solid line in FIG. 4.

Figure 6:
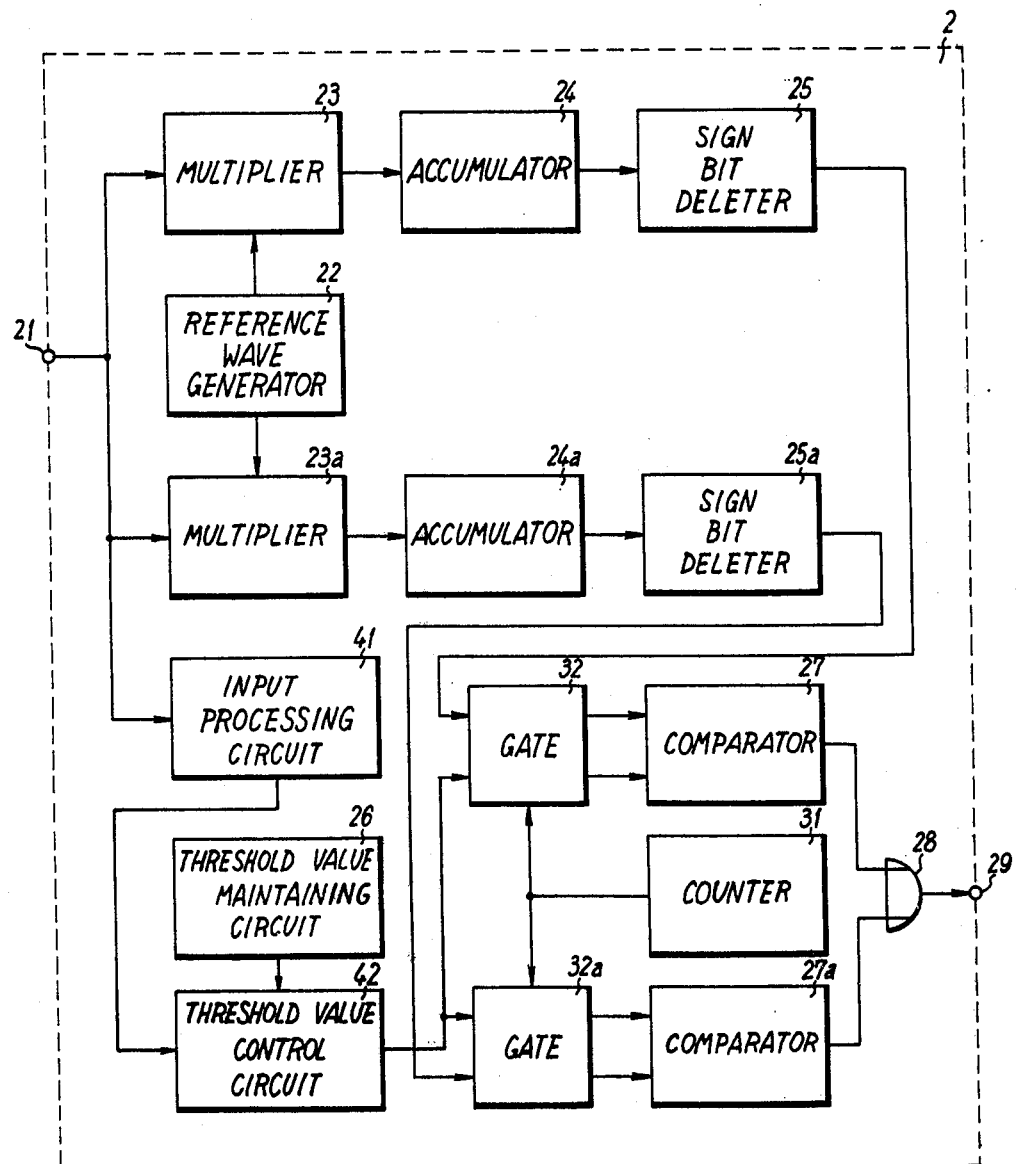

In the above examples, even if each amplitude $A_0$ of the reference waves is constant, the amplitude $A_1$ of the input signal is not constant due to dispersion of communication circuits, level fluctuation, etc. so that is is necessary to control the threshold value by the input signal. This can be achieved, for example, by controlling the threshold value by calculating a mean level of the input signal, or by controlling the threshold value in accordance with the accumulated value of the input signal. A block diagram of a circuit for controlling the threshold value by the input signal is shown in FIG. 6 in the same manner as FIG. 5. In FIG. 6, reference numeral 41 indicates an input processing circuit for calculating the abovesaid input mean level and accumulating the input signal and, 42 designates a threshold value control circuit for controlling the threshold value maintained in the threshold value maintaining circuit 26 by the output of the input processing circuit 41. Though described above in connection with the case where the input signal is a single-frequency signal, the principle is also effective in the case of the input signal being a multi-frequency signal. In the case of, for example, two frequencies $(f_1 + f_2)$, the equation (1) is replaced by the following equation:

$$Y' = A_1 \sin(2\pi f_1 t + \phi_1) + A_2 \sin(2\pi f_2 t + \phi_2) \qquad (1_a)$$

The product outputs of the above input signal and the reference waves $R_1$ and $R_2$ are given as follows:

$$y_1' = \frac{A_1 A_0}{2}[\cos\{2\pi(f_1 - f_0)t + (\phi_1 - \phi_0)\}$$
$$- \cos\{2\pi(f_1 + f_0)t + (\phi_1 + \phi_0)\}]$$
$$+ \frac{A_2 A_0}{2}[\cos\{2\pi(f_2 - f_0)t + (\phi_2 - \phi_0)\}$$
$$- \cos\{2\pi(f_2 + f_0)t + (\phi_2 + \phi_0)\}] \qquad (4_a)$$

$$y_2' = \frac{A_1 A_0}{2}[\sin\{2\pi(f_1 - f_0)t + (\phi_1 - \phi_0)\}$$
$$+ \sin\{2\pi(f_1 + f_0)t + (\phi_1 + \phi_0)\}]$$
$$+ \frac{A_2 A_0}{2}[\sin\{2\pi(f_2 - f_0)t + (\phi_2 - \phi_0)\}$$
$$+ \sin\{2\pi(f_2 + f_0)t + (\phi_2 + \phi_0)\}] \qquad (5_a)$$

Further, their accumulated values are as follows:

$$Y_1' = \sum_{n}^{} y_1' = \frac{A_1 A_0}{2}\left[\frac{\cos\left\{(n-1)\frac{\alpha}{2} - \phi_A\right\}}{\sin\frac{\alpha}{2}} \sin n\frac{\alpha}{2}\right.$$
$$- \frac{\cos\left\{(n-1)\frac{\beta}{2} - \phi_B\right\}}{\sin\frac{\beta}{2}} \sin n\frac{\beta}{2}\right]$$
$$+ \frac{A_2 A_0}{2}\left[\frac{\cos\left\{(n-1)\frac{\gamma}{2} - \phi_C\right\}}{\sin\frac{\gamma}{2}} \sin n\frac{\gamma}{2}\right.$$
$$\left. - \frac{\cos\left\{(n-1)\frac{\delta}{2} - \phi_D\right\}}{\sin\frac{\delta}{2}} \sin n\frac{\delta}{2}\right] \qquad (6_a)$$

$$Y_2' = \sum_{n}^{} y_2' = \frac{A_1 A_0}{2}\left[\frac{\sin\left\{(n-1)\frac{\alpha}{2} - \phi_A\right\}}{\sin\frac{\alpha}{2}} \sin n\frac{\alpha}{2}\right.$$

-continued $$+ \frac{\sin\left\{(n-1)\frac{\beta}{2} - \phi_B\right\}}{\sin\frac{\beta}{2}} \sin n\frac{\beta}{2}\Bigg]$$

$$+ \frac{A_2 A_0}{2}\Bigg[\frac{\cos\left\{(n-1)\frac{\gamma}{2} - \phi_C\right\}}{\sin\frac{\gamma}{2}} \sin n\frac{\gamma}{2}$$

$$+ \frac{\sin\left\{(n-1)\frac{\delta}{2} - \phi_D\right\}}{\sin\frac{\delta}{2}} \sin n\frac{\delta}{2}\Bigg] \quad (7_a)$$

The third and fourth terms are new terms, in which $$\gamma = 2\pi(f_2 - f_0)\tau \quad (15)$$

$$\delta = 2\pi(f_2 + f_0)\tau \quad (16)$$

$$\phi_C = \phi_2 - \phi_0 \quad (17)$$

$$\phi_D = \phi_2 + \phi_0 \quad (18)$$

Since the multi-frequency signal used in telephone switching, for example, in the No. 5 signalling system, is composed of a combination of two of 900Hz, 1100Hz, 1300Hz, 1500Hz, 1700Hz and 1900Hz, a minimum difference between $f_1$ and $f_2$ is 200Hz. Calculating the newly added terms under the conditions: $f_0 = 1000$Hz, $f_1 = 1010$Hz and $f_2 = 1200$Hz as in the foregoing so as to facilitate understanding, the value at the time of $f_\gamma = 200$Hz, that is, $$1/\sin\frac{\gamma}{2} \approx 1.2,$$

and the value at the time $f_\delta = 2200$Hz, that is, $$1/\sin\frac{\delta}{2} \approx 1.3,$$

are obtained from FIG. 2. The aforementioned $f_\alpha$ and $f_\beta$ are $$1/\sin\frac{\alpha}{2} \approx 250 \text{ and } 1/\sin\frac{\beta}{2} \approx 1.5,$$

respectively, and it follows that $$1/\sin\frac{\alpha}{2} \gg 1/\sin\frac{\gamma}{2} > 1/\sin\frac{\beta}{2} > 1/\sin\frac{\delta}{2}.$$

The values of the accumulated values ($6_a$) and ($7_a$) in the case of the multi-frequency input signal are also determined depending upon the value of each first term $$1/\sin\frac{\alpha}{2}.$$

Accordingly, it will be seen that if the values of the second, third and fourth terms are closely considered in the circuit design, the present invention may well also be applied to the identification of the multi-frequency signal of two frequencies. Further, this invention is also applicable to the identification of multi-frequency signals composed of not only two frequencies but also more than three frequencies.

Figure 7:
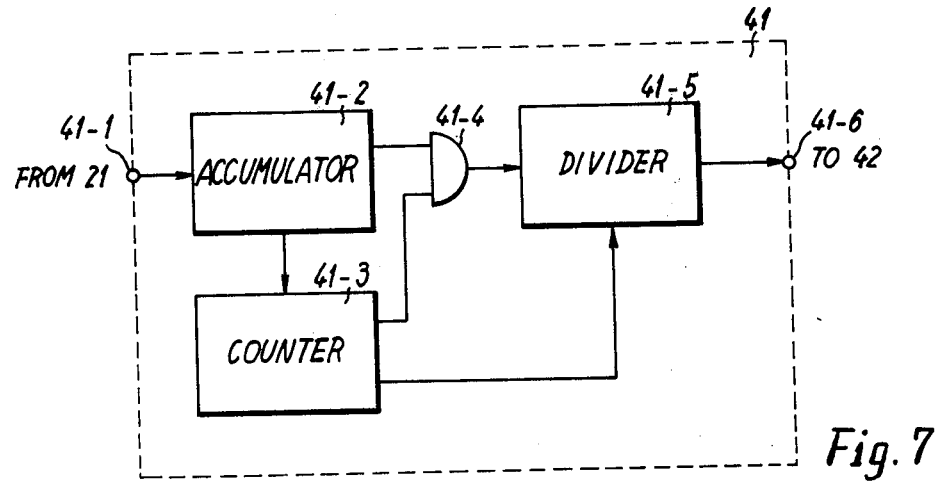
FIGS. 7 and 8 are block diagrams each illustrating an example of an input processing circuit employed in this invention.

An example of the input processing circuit 41 for obtaining the mean level of the input signal comprises, as shown in FIG. 7, a terminal 41-1 connected to the terminal 21, an accumulator 41-2 for accumulating the input pulse train, a counter 41-3 for counting the number of accumulation operations in the accumulator 41-2, an AND gate 41-4, a divider 41-5 and a terminal 41-6 connected to the threshold value control circuit 42. The counter supplies an output pulse to the AND gate 41-4 when the counting state reaches a predetermined counting state, so that the contents of the accumulator 41-2 passes through the AND gate 41-4. The divider 41-5 divides the applied contents of the accumulator 41-2 by a number designated by the counting state of the counter 41-3 to obtain a mean level.

Figure 8:
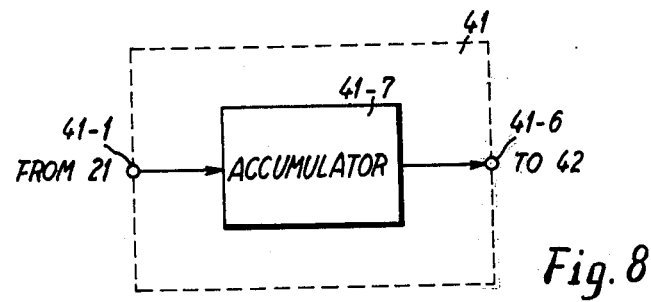

The input processing circuit 41 may be composed of an accumulator 41-7 as shown in FIG. 8.

Figure 9:
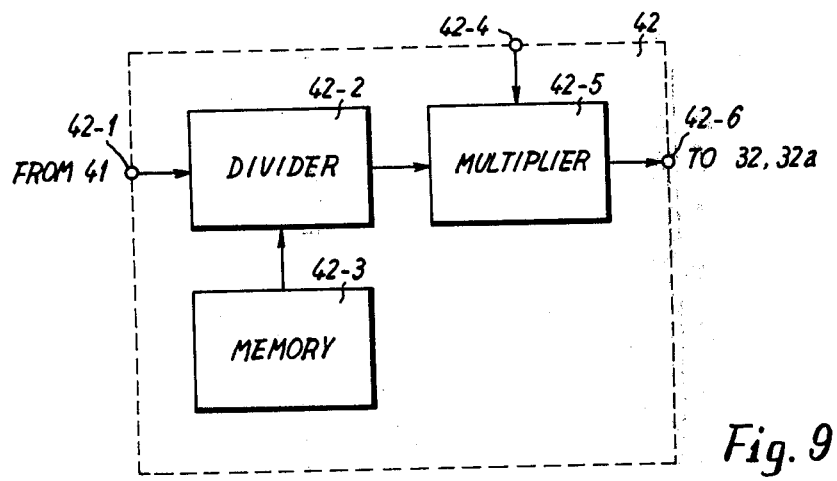
FIG. 9 is a block diagram illustrating an example of a threshold value control circuit employed in this invention.

An example of the threshold value control circuit 42 comprises, as shown in FIG. 9, a terminal 42-1 connected to the input processing circuit 41, a read-only memory for storing a standard value, a divider 42-2 for dividing the input from the terminal 42-1 by the standard value, a terminal 42-4 connected to the threshold value maintaining circuit 26 and receptive of the threshold value, a multiplier 42-5 multiplying the output of the divider 42-2 by the threshold value, and a terminal 42-6 connected to the output of the multiplier 42-5 for supplying the multiplied output to the gates 32 and 32a.

The sign bit deleters 25 or 25a each comprise a plurality of signal paths which pass bits, except the sign bit, of parallel signal configuration from the accumulator 24 or 24a to the comparator 27, 27a, respectively.

In a case where rectangular wave reference pulse trains shown in FIG. 1B are employed instead of sine wave reference pulse trains shown in FIG. 1C, data processing speed can be effectively improved in addition to simplification of the circuit construction because of effective lowering of a number of handled bits.

As has been described in detail in the foregoing, with this invention, identification is achieved entirely by digital operation, so that apparatus can be not only reduced in size but also multiplexed by the use of recent high-speed operating elements such as LSI, etc., and hence can be made economical. Further, this invention is applicable in the case of future PCM switching system as well as time-sharing multiplex system by digitalization of the present identification.

Although the foregoing description has been given with regard to the case of effecting signal identification by digital operation of a PCM code converted from an input signal, it is a matter of course that the invention is also applicable to signal identification by analog operation of an input pulse train such as PAM codes, etc.

What we claim is:
1. In a signal identification system receptive in use of a pulse train representative of an analog signal for detecting a specified frequency component of the analog signal represented by the input pulse train, the improvement of the system comprising:

input terminal means receptive of an input pulse train representative of an analog signal;

pulse generation means for generating two reference wave pulse trains each periodic at a specified frequency of a frequency component of the analog signal but displaced in phase by $\pi/2$ from each other;

two multipliers each connected to said input terminal means and said pulse generation means for receiving and multiplying said input pulse train by said two reference wave pulse trains to each develop an output signal equal to the product of the respective received signals;

two accumulators each connected to a respective one of said two multipliers for accumulating a respective one of the output signals developed by said two multipliers;

threshold means controllable for producing an output signal representative of a certain threshold value;

two comparators each connected to a respective one of said accumulators and both connected to said threshold means for developing an output to identify the presence of said analog signal component of the specified frequency when the absolute value of at least one of the accumulated values exceeds said threshold value; and threshold value control means connected to said input terminal means and said threshold means for controlling the threshold value represented by the output signal of said threshold means in accordance with an average DC level of the input pulse train for rendering the outputs developed by said comparators independent of amplitude variations of the input pulse train.

2. A signal identification system according to claim 1, in which said pulse generation means develops two reference wave pulse trains having rectangular wave envelopes.

3. A signal identification system according to claim 1, in which each of said comparators compares the content of the respective one of said accumulators with the output signal of said threshold means after a certain number of reference wave pulses determined by a permissible frequency deviation and permissible level fluctuation of the signal of the specified frequency.

4. A signal identification system according to claim 3, in which said pulse generation means develops two reference wave pulse trains having rectangular wave envelopes.

* * * * *